United States Patent
Suzuki et al.

(10) Patent No.: US 12,151,982 B2
(45) Date of Patent: Nov. 26, 2024

(54) HEAT SHIELD COMPONENT AND MANUFACTURING METHOD THEREOF

(71) Applicant: Nissan Motor Co., Ltd., Yokohama (JP)

(72) Inventors: Yuka Suzuki, Kanagawa (JP); Yutaka Mabuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/232,174

(22) Filed: Aug. 9, 2023

(65) Prior Publication Data

US 2023/0382814 A1    Nov. 30, 2023

Related U.S. Application Data

(62) Division of application No. 16/638,664, filed as application No. PCT/JP2017/029293 on Aug. 14, 2017, now abandoned.

(51) Int. Cl.
  *C04B 38/00* (2006.01)
  *C04B 35/48* (2006.01)
  (Continued)

(52) U.S. Cl.
  CPC .......... *C04B 38/0074* (2013.01); *C04B 35/48* (2013.01); *C04B 35/581* (2013.01);
  (Continued)

(58) Field of Classification Search
  CPC .............. C04B 38/0096; C04B 35/581; C04B 38/0054; C04B 38/0074; C04B 38/0625; C04B 35/48
  See application file for complete search history.

(56) References Cited

U.S. PATENT DOCUMENTS

| | | |
|---|---|---|
| 9,738,788 B1 | 8/2017 | Gross et al. |
| 2012/0159952 A1 | 6/2012 | Arikawa et al. |
| (Continued) | | |

FOREIGN PATENT DOCUMENTS

| | | |
|---|---|---|
| CN | 102256695 A | 11/2011 |
| EP | 2436898 A | 4/2012 |
| (Continued) | | |

OTHER PUBLICATIONS

Industrial Chemistry of Oxides for Emerging Applications, 2018, John Wiley & Sons (Year:2018) (1 page).

(Continued)

*Primary Examiner* — Alexander M Weddle
(74) *Attorney, Agent, or Firm* — Young Basile Hanlon & MacFarlane, P.C.

(57) ABSTRACT

A manufacturing method of a heat shield component includes a mixing step of mixing sol including a ceramic precursor with heat-expandable microspheres having an outer shell formed of thermoplastic resin and encapsulating a foaming agent so as to obtain a mixed solution, a coating step of applying the mixed solution to a substrate to obtain a coated product, and a heating step of heating the coated product to form a base body including a ceramic from the ceramic precursor, and leading the heat-expandable microspheres to foam so as to form a ceramic porous layer including closed pores in the base body. The ceramic porous layer has a porosity in a range of 40% to 70%.

9 Claims, 3 Drawing Sheets

(51) Int. Cl.
C04B 35/581 (2006.01)
C04B 38/06 (2006.01)
C23C 28/04 (2006.01)
F02B 77/11 (2006.01)

(52) U.S. Cl.
CPC ........ C04B 38/0625 (2013.01); C23C 28/042 (2013.01); F02B 77/11 (2013.01)

(56) References Cited

U.S. PATENT DOCUMENTS

2017/0167373 A1   6/2017   Hong et al.
2018/0037510 A1   2/2018   Durrett et al.

FOREIGN PATENT DOCUMENTS

| | | | |
|---|---|---|---|
| JP | S60-184950 A | 9/1985 | |
| JP | H01-199625 A | 8/1989 | |
| JP | 2010-70792 A | 4/2010 | |
| JP | 2010185291 | 8/2010 | |
| KR | 20160076499 A | 6/2016 | |
| WO | WO-2010070987 A1 * | 6/2010 | .............. B01J 13/18 |

OTHER PUBLICATIONS

Fast Radius, Know Your Materials: Polymethyl Methacrylate(PMMA/Acrylic),Jul. 8, 2021(Year:2021) (3 page).

* cited by examiner

HEAT SHIELD COMPONENT AND MANUFACTURING METHOD THEREOF

CROSS-REFERENCE TO RELATED APPLICATION(S)

This application is a divisional of U.S. patent application Ser. No. 16/638,664, filed on Feb. 12, 2020, which is a 371 National Phase application of International Patent Application Serial No. PCT/JP2017/029293, filed on Aug. 14, 2017, the contents of which are herein incorporated in their entireties by reference.

TECHNICAL FIELD

The present invention relates to a heat shield component and a manufacturing method thereof. In particular, the present invention relates to a heat shield component having high heat-insulating properties and a manufacturing method thereof.

BACKGROUND

Recent efforts have focused on an improvement in thermal efficiency in, for example, an internal combustion engine such that an inner wall surface of a combustion chamber is provided with a thin film having heat-insulating properties so as not to release heat in the combustion chamber.

For example, Japanese Unexamined Patent Application Publication No. 2010-70792 discloses a thin-film formation method including a particle production process, a heating process for gas releasing, and a heating process for baking, so as to form, on a substrate, a thin film provided with bubbles in particles. The particle production process produces particles of resin and covered with layers made of an inorganic compound. The heating process for gas releasing heats the thin film including an organic compound and numbers of particles and applied to the substrate to gasify the resin in the particles, and releases gas generated by thermal decomposition of the organic compound from the thin film. The heating process for baking heats the thin film after the heating process for gas releasing at a higher temperature than the heating temperature in the heating process for gas releasing, so as to make the layers of the inorganic compound more dense, and bake the organic compound after the thermal decomposition.

Japanese Unexamined Patent Application Publication No. 2010-70792 discloses that the pores are covered with the inorganic compound. Since heat is transferred through the inorganic compound, the structure of the engine combustion chamber disclosed in Japanese Unexamined Patent Application Publication No. 2010-70792 cannot allow the substrate to have sufficient heat-insulating properties.

SUMMARY

To solve the conventional problems described above, the present invention provides a heat shield component having high heat-insulating properties.

A heat shield component according to an aspect of the present invention includes a substrate, and a ceramic porous layer including pores, wherein inner walls of the pores are covered with thermoplastic resin, and a porosity of the ceramic porous layer is set in a predetermined range.

DETAILED DESCRIPTION

A heat shield component and a manufacturing method thereof according to the present embodiment will be described below with reference to the drawings. The dimensions of elements in the drawings may be exaggerated for illustration purposes, and are not necessarily drawn to scale.

[Heat Shield Component]

Figure 1:
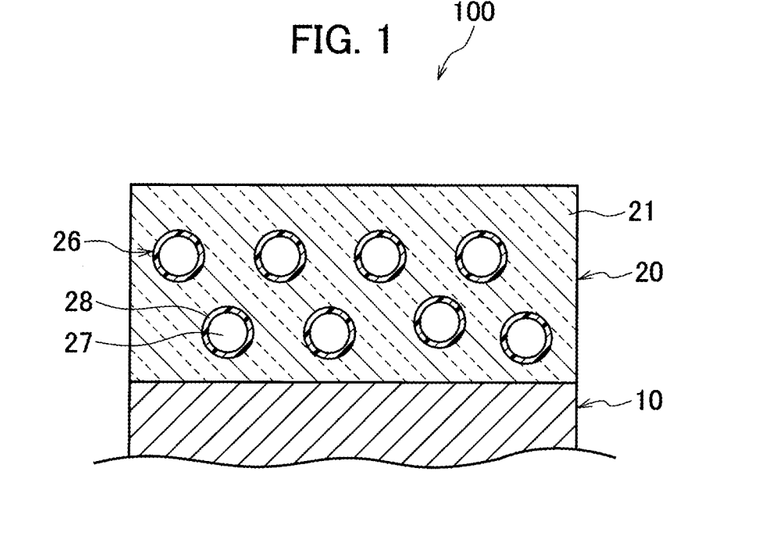
FIG. 1 is a cross-sectional view illustrating an example of a heat shield component according to the present embodiment.
Figure 2:
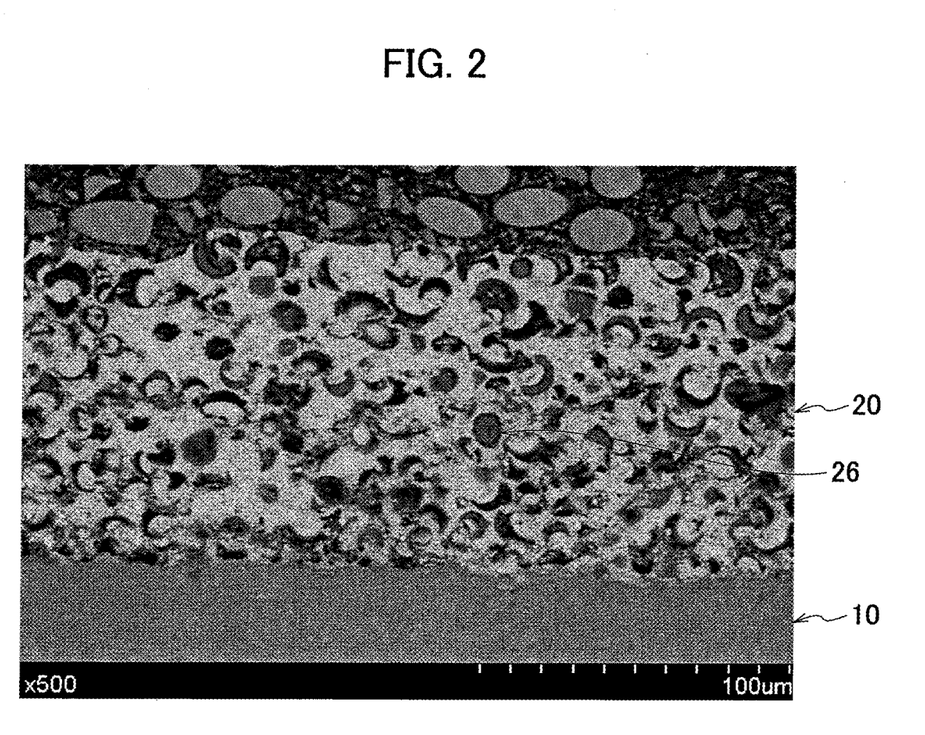
FIG. 2 is an electron microphotograph showing the heat shield component in cross section according to the present embodiment.

As shown in FIG. 1, a heat shield component 100 according to the present embodiment includes a substrate 10 and a ceramic porous layer 20. FIG. 1 is a cross-sectional view showing an example of the heat shield component according to the present embodiment. FIG. 2 is an electron microphotograph showing an example of the heat shield component in cross section according to the present embodiment. The heat shield component 100 according to the present embodiment including the ceramic porous layer 20 can block external heat so as not to be transmitted to the substrate 10. The respective elements are described in detail below.

<Substrate 10>

A material included in the substrate 10 is determined as appropriate, and may be metal such as aluminum, magnesium, and iron. The shape and the thickness of the substrate 10 may be determined as appropriate depending on the purpose.

<Ceramic Porous Layer 20>

The ceramic porous layer 20 is arranged on the substrate 10. The ceramic porous layer 20 may be directly formed on the substrate 10, or another layer such as an adhesion layer may be interposed between the respective layers. The embodiment shown in FIG. 1 illustrates a case in which the ceramic porous layer 20 is directly arranged on the substrate 10.

The ceramic porous layer 20 includes a base body 21 and pores 26. The ceramic porous layer 20 may further include additives in addition to the base body 21 and the pores 26.

The base body 21 includes ceramic. The ceramic used for the base body 21 may be determined as appropriate depending on the purpose of the heat shield component 100. Examples of ceramic include inorganic compounds such as an oxide, a nitride, a carbide, and a boride. These compounds may be used singly or may be selectively combined together.

The ceramic can be either an oxide or a nitride of metal. Examples of oxides of metal include zirconia ($ZrO_2$), yttrium oxide ($Y_2O_3$), and alumina ($Al_2O_3$). Examples of nitrides of metal include aluminum nitride (AlN), silicon nitride ($Si_3N_4$), boron nitride (BN), and titanium nitride (TiN).

The ceramic is particularly preferably either zirconia or aluminum nitride. These materials have a low thermal conductivity, and have high intensity and toughness.

The pores 26 are included in the base body 21. The pores 26 may have any shape, such as a spherical shape, a hemispherical shape, an elliptical shape, and a crescent shape.

The inner walls of the pores 26 are covered with thermoplastic resin. A thermoplastic resin layer 28 is provided on the inside of the respective pores 26, and a hollow portion 27 is provided in the thermoplastic resin layer 28. The thermoplastic resin layers 28 according to the present embodiment keep the shape of the pores 26 so as to prevent the hollow portions 27 from being pressed and flattened in the base body 21. According to the present embodiment, the inner walls of the pores 26 are covered with the thermoplastic resin having a lower thermal conductivity than an inorganic compound, so as to block transmission of external heat toward the substrate 10 to improve the heat-insulating properties of the heat shield component 100. The inner walls of the pores 26 are not necessarily completely covered with the thermoplastic resin when the hollow portions 27 are provided, but preferably 80% or greater, more preferably 90% or greater, and still more preferably 95% or greater of the inner walls of the pores 26 are covered with the thermoplastic resin.

The inner diameter of the hollow portions 27 is preferably, but not necessarily, set in a range of 5 μm to 100 μm, and more preferably in a range of 5 μm to 50 μm. The inner diameter of the hollow portions 27 set in the above range can achieve both the intensity and the heat-insulating properties of the ceramic porous layer 20. The inner diameter of the hollow portions 27 may be an average value of inner diameters of several tens of the hollow portions 27 observed in a photograph of the ceramic porous layer 20 in cross section with a scanning electron microscope (SEM), for example.

The thermoplastic resin included in the thermoplastic resin layer 28 is preferably, but not necessarily, a polymer of one or more monomers selected from the group consisting of 1,1-dichloroethylene, acrylonitrile, methacrylonitrile, acrylic acid, methacrylic acid, acrylic ester, methacrylic ester, styrene, and vinyl acetate.

The thickness of the thermoplastic resin layer 28 is preferably, but not necessarily, set in a range of 0.1 μm to 20 μm. The thickness of the thermoplastic resin layer 28 set to 0.1 μm or greater can firmly keep the shape of the pores. The thickness of the thermoplastic resin layer 28 set to 20 μm or less can reduce the thermal conduction by the thermoplastic resin, so as to further improve the heat-insulating properties. The thickness of the thermoplastic resin layer 28 is more preferably set in a range of 2 μm to 15 μm.

The porosity of the ceramic porous layer 20 according to the present embodiment is in a range of 40% to 70%. The porosity of the ceramic porous layer 20 set to 40% or greater provides a sufficient number of pores, achieving the ceramic porous layer with the sufficient heat-insulating properties. The porosity of the ceramic porous layer 20 set to 70% or less can keep the physical strength of the ceramic porous layer 20. The porosity of the ceramic porous layer 20 may be measured such that the cross section is observed with an electron microscope so as to calculate a percentage of the areas of the pores in the ceramic porous layer 20.

The thickness of the ceramic porous layer 20 is preferably, but not necessarily, set in a range of 30 μm to 500 μm. The thickness of the ceramic porous layer 20 set to 30 μm or greater can improve the heat-insulating properties of the heat shield component 100. The thickness of the ceramic porous layer 20 set to 500 μm or less can prevent combustion gas in a cylinder from being excessively heated so as to avoid knocking. The thickness of the ceramic porous layer 20 is more preferably set in a range of 30 μm to 200 μm.

The thermal conductivity of the ceramic is preferably 5 W/(m·K) or less. The thermal conductivity of the ceramic set to 5 W/(m·K) or less can improve the heat-insulating properties of the heat shield component 100. The lower limit of the thermal conductivity of the ceramic is determined as appropriate, and may be set to 0.1 W/(m·K) or greater, for example. The thermal conductivity of the ceramic may be calculated by multiplying a density, a specific heat capacity, and a heat diffusion time of the ceramic.

The thermal conductivity of the ceramic porous layer 20 is preferably 1 W/(m·K) or less. The thermal conductivity of the ceramic porous layer 20 set to 1 W/(m·K) or less can improve the heat-insulating properties of the heat shield component 100. The lower limit of the thermal conductivity of the ceramic porous layer 20 is determined as appropriate, and may be set to 0.01 W/(m·K) or greater, for example. The thermal conductivity of the ceramic porous layer 20 may be calculated by multiplying a density, a specific heat capacity, and a heat diffusion time of the ceramic porous layer 20.

More preferably, the thermal conductivity of the ceramic is 5 W/(m·K) or less, and the thermal conductivity of the ceramic porous layer 20 is 1 W/(m·K) or less when the heat-insulating properties of the heat shield component 100 is taken into account. Particularly preferably, the thermal conductivity of the ceramic is 5 W/(m·K) or less, and the thermal conductivity of the ceramic porous layer 20 is 0.5 W/(m·K) or less.

A volumetric specific heat of the ceramic porous layer 20 is preferably 1500 kJ/m$^3$K or less. The volumetric specific heat of the ceramic porous layer 20 set to 1500 kJ/m$^3$K or less can improve the heat-insulating properties of the heat shield component 100. The volumetric specific heat of the ceramic porous layer 20 is more preferably 1000 kJ/m$^3$K or less. The lower limit of the volumetric specific heat of the ceramic porous layer 20 is determined as appropriate, and is 10 kJ/m$^3$K or greater, for example. The volumetric specific heat of the ceramic porous layer 20 may be calculated by multiplying the density and the specific heat capacity of the ceramic porous layer 20.

<Cover Layer 30>

Figure 3:
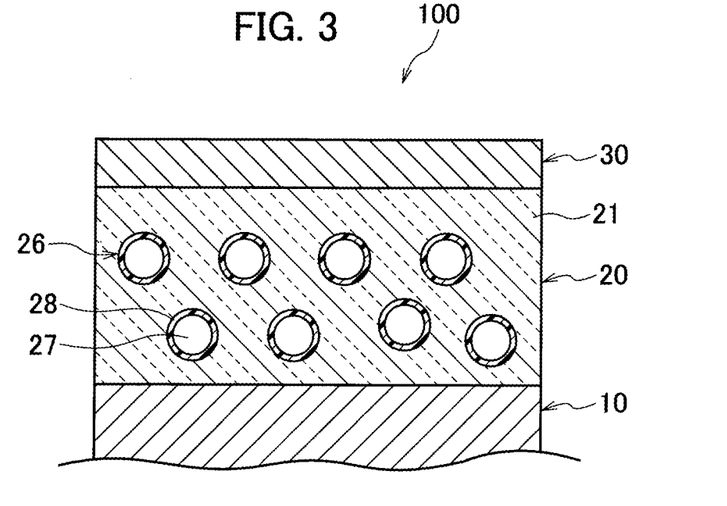
FIG. 3 is a cross-sectional view illustrating another example of the heat shield component according to the present embodiment.

As shown in FIG. 3, the heat shield component 100 according to the present embodiment preferably further includes a cover layer 30 including silica and covers the surface of the ceramic porous layer 20. The cover layer 30 can not only improve thermal resistance but further improve the heat-insulating properties of the heat shield component 100 when provided on the surface of the ceramic porous layer 20, since the cover layer 30 covers open pores not covered with the thermoplastic resin on the surface of the ceramic porous layer 20 so as to provide closed pores.

The cover layer 30 including silica may be obtained such that a solution including polysilazane, for example, is applied to the surface of the ceramic porous layer 20 and then cured.

The cover layer 30 may have any thickness that can provide closed pores on the surface of the ceramic porous layer 20, but is preferably set to 0.01 μm or greater and 5 μm or less. The thickness of the cover layer 30 set to 0.01 μm or greater can improve the thermal resistance of the heat shield component. The thickness of the cover layer 30 set to 5 μm or less can prevent cracks caused in the cover layer 30.

As described above, the heat shield component according to the present embodiment includes the substrate, and the ceramic porous layer arranged on the substrate, the ceramic porous layer including the base body including the ceramic, and the pores included in the base body. In the heat shield component according to the present embodiment, the inner walls of the pores are covered with the thermoplastic resin, and the porosity of the ceramic porous layer is in the range of 40% to 70%.

According to the heat shield component of the present embodiment, the pores are covered with the thermoplastic resin on the inner walls, and the porosity of the ceramic porous layer is set in the predetermined range. The heat shield component has higher heat-insulating properties than a case in which pores are provided with an inorganic compound. The heat shield component when used in an internal combustion engine can avoid releasing heat in a combustion chamber, so as to improve the thermal efficiency in the internal combustion engine.

[Internal Combustion Engine]

An internal combustion engine according to the present embodiment is described below. The internal combustion engine according to the present embodiment includes the heat shield component. The heat shield component has high heat-insulating properties as described above, and thus can be used for the internal combustion engine to improve the thermal efficiency of the internal combustion engine. The heat shield component is preferably arranged on a surface of a member subjected to combustion gas to result in high temperature. Examples of members subjected to combustion gas to result in high temperature include a component included in a combustion chamber, such as a piston, a cylinder head, a valve, and a cylinder, and a component in an exhaust system, such as a cylinder head-exhaust port, an exhaust manifold, an exhaust pipe, and a turbocharger. The heat shield component is not necessarily provided on the entire surface of each of these components, and may be applied to part of a surface subjected to combustion gas to result in high temperature.

[Manufacturing Method of Heat Shield Component]

Figure 4:
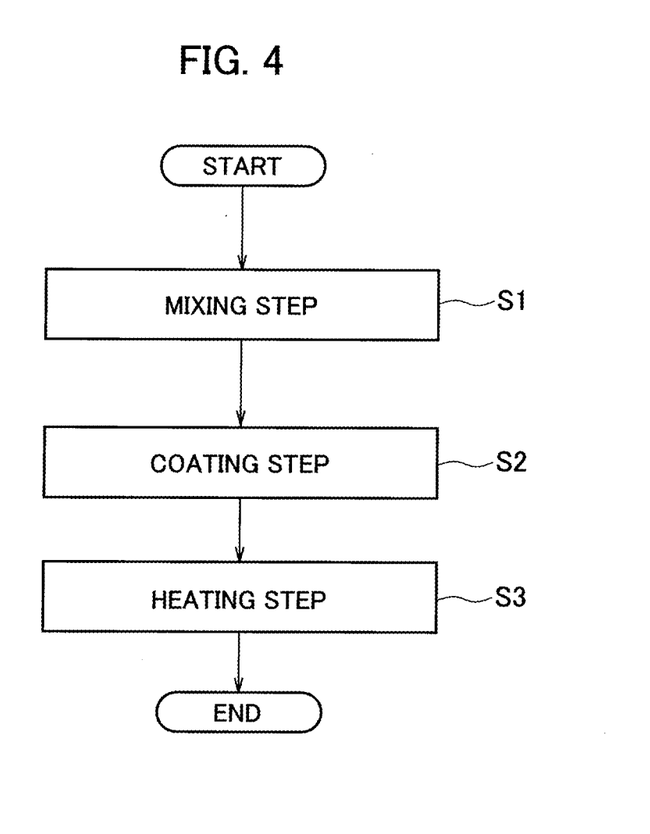
FIG. 4 is a flowchart showing a manufacturing method of the heat shield component according to the present embodiment.

As shown in FIG. 4, a manufacturing method of the heat shield component according to the present embodiment includes a mixing step S1, a coating step S2, and a heating step S3. The respective steps are described in detail below.

In the mixing step S1, sol and heat-expandable microspheres are mixed together to obtain a mixed solution. The method of mixing the sol and the heat-expandable microspheres together may be any method that can disperse and mix the heat-expandable microspheres in the sol with a single screw kneader, a twin screw kneader, or a planetary mixer and kneader, for example.

The sol includes a ceramic precursor. The ceramic precursor is a substance as a precursor of the above ceramic. Examples of ceramic precursors include alkoxides of one or more metals or metalloids selected from the group consisting of zirconium, yttrium, aluminum, silicon, and titanium. The type of the alkoxide may be determined as appropriate, and examples thereof include methoxide, ethoxide, propoxide, and butoxide.

The heat-expandable microspheres have an outer shell formed of thermoplastic resin and encapsulating a foaming agent. The use of the above heat-expandable microspheres can provide the pores 26 in the base body 21 in the heating step S3.

The thermoplastic resin included in the outer shell is preferably a polymer of one or more monomers selected from the group consisting of 1,1-dichloroethylene, acrylonitrile, methacrylonitrile, acrylic acid, methacrylic acid, acrylic ester, methacrylic ester, styrene, and vinyl acetate, for example.

Examples of foaming agents include hydrocarbon such as ethane, ethylene, propane, propene, n-butane, isobutane, butene, isobutene, n-pentane, isopentane, neopentane, n-hexane, isohexane, cyclohexane, and heptane, chlorofluorocarbon such as trichlorofluorocarbon, and tetraalkylsilane such as tetramethylsilane. One of these foaming agents may be used independently, or two or more foaming agents may be used together.

A film thickness of the outer shell of the heat-expandable microspheres before foaming is preferably set in a range of 0.1 μm to 20 μm, and more preferably in a range of 2 μm to 15 μm. The film thickness of the outer shell of the heat-expandable microspheres before foaming set in the above range enables appropriate foaming at a predetermined temperature and prevents rupture of the particles after foaming.

An average particle diameter of the heat-expandable microspheres including the outer shell is preferably set in a range of 1 μm to 50 μm, and more preferably in a range of 5 μm to 20 μm. The average particle diameter of the heat-expandable microspheres set in the above range can lead the pores to have a size in a preferred range, so as to achieve both the intensity and the heat-insulating properties of the ceramic porous layer. The average particle diameter is a particle diameter corresponding to 50% in the volume-based cumulative particle size distribution, and may be measured by a laser diffraction/scattering method, for example.

The content of the heat-expandable microspheres is preferably set in a range of 10% to 30% by mass with respect to 100% by mass of the total amount of the sol and the heat-expandable microspheres excluding an organic solvent. The content of the heat-expandable microspheres set to 10% by mass or greater can increase the mechanical strength of the ceramic porous layer 20. The content of the heat-expandable microspheres set to 30% by mass or less enables the ceramic porous layer 20 to be formed in an appropriate state. When the ceramic porous layer 20 includes zirconia, the content of the heat-expandable microspheres is preferably set in a range of 20% to 30% by mass with respect to 100% by mass of the total amount of the sol and the heat-expandable microspheres. When the ceramic porous layer 20 includes aluminum nitride, the content of the heat-expandable microspheres is preferably set in a range of 10% to 15% by mass with respect to 100% by mass of the total amount of the sol and the heat-expandable microspheres.

The film thickness of the outer shell of the heat-expandable microspheres after foaming (the thermoplastic resin layer 28) is preferably set in a range of 0.1 μm to 20 μm. The film thickness of the thermoplastic resin layer 28 set to 0.1 μm or greater can keep the shape of the pores more firmly. The film thickness of the thermoplastic resin layer 28 set to 20 μm or less can reduce the thermal conduction by the thermoplastic resin, so as to further improve the heat-insulating properties. The thickness of the thermoplastic resin layer 28 is more preferably set in a range of 2 μm to 15 μm.

In the mixing step S1, an organic solvent may be added to the mixed solution, in addition to the sol and the heat-expandable microspheres. Examples of organic solvents include an alcohol-based solvent such as methanol, ethanol, propanol, and butanol, an ether-based solvent such as tetrahydrofuran and 1,4-dioxane, an amide-based solvent such as N,N-dimethylformamide, N,N-dimethylacetamide, and N-methylpyrrolidone, and a nitrile-based solvent such as acetonitrile.

<Coating Step>

In the coating step S2, the mixed solution is applied to a substrate to obtain a coated product. The substrate may be the same as the substrate described above.

The method of applying the sol to the substrate may be any conventionally-known method, such as spray coating, roll coating, doctor blading, flow coating, dip coating, spin coating, screen printing, and ink jetting.

<Heating Step>

In the heating step S3, the coated product is heated so as to form the base body 21 including the ceramic from the ceramic precursor. For example, when the metal or metalloid alkoxide as described above is used as the ceramic precursor, the metal or metalloid alkoxide is polymerized by hydrolysis and dehydration/condensation between molecules by a sol-gel method. The base body 21 including the ceramic is then formed on the substrate 10.

In the heating step S3, the heat-expandable microspheres are led to foam so as to form the ceramic porous layer 20 in which the pores 26 are included in the base body 21. As described above, the heat-expandable microspheres have the outer shell formed of the thermoplastic resin and encapsulating the foaming agent. When the coated product is baked, the thermoplastic resin exceeds a glass transition point to be softened, and the foaming agent inside the outer shell is then gasified. The foaming agent gasified in the heating step S3 can provide bubbles in the thermoplastic resin. Namely, the pores 26 can be provided in the base body 21.

The temperature and the time for heating the coated product may be determined as appropriate depending on the type of the ceramic precursor and the type of the heat-expandable microspheres used. The temperature for heating the coated product is preferably 280° C. or lower so as not to lead the substrate 10 to be softened and deformed.

The heating step S3 may include a drying step, a foaming step, and a baking step.

In the drying step, the mixed solution including the organic solvent, for example, added in the mixing step S1 to be volatilized and applied, is dried. The drying step can shorten a gap between the molecules of the ceramic precursor to facilitate the condensation reaction, enabling the base body 21 including the ceramic to be formed in an appropriate state. The drying temperature in the drying step is preferably, but not necessarily, set to be lower than the temperature at which the heat-expandable microspheres start foaming. The drying temperature may be set in a range of 30° C. to 80° C., for example. The drying time in the drying step is determined as appropriate, and may be set to 5 to 60 minutes, for example.

In the foaming step, the heat-expandable microspheres are led to foam. The foaming temperature in the foaming step may be set in a range of 80° C. to 210° C., and determined depending on the type of the heat-expandable microspheres. The foaming time in the foaming step is determined as appropriate, and may be set to 60 to 180 minutes, for example.

In the baking step, the base body 21 including the ceramic is formed from the ceramic precursor, and a volatile component such as the organic solvent is volatilized. The baking temperature in the baking step may be set in a range of 150° C. to 280° C., and determined depending on the type of the ceramic precursor. The baking time in the baking step is determined as appropriate, and may be set to 60 to 180 minutes, for example.

The porosity of the ceramic porous layer 20 according to the present embodiment is set in the range of 40% to 70% as described above. The porosity of the ceramic porous layer 20 set to 40% or greater provides a sufficient number of pores, achieving the ceramic porous layer 20 with the sufficient heat-insulating properties. The porosity of the ceramic porous layer 20 set to 70% or less can keep the physical strength of the ceramic porous layer 20. The porosity of the ceramic porous layer 20 may be measured such that the cross section is observed with an electron microscope so as to calculate a percentage of the areas of the pores in the ceramic porous layer 20.

As described above, the manufacturing method of the heat shield component according to the present embodiment includes the mixing step of mixing the sol including the ceramic precursor with the heat-expandable microspheres having the outer shell formed of the thermoplastic resin and encapsulating the foaming agent so as to obtain the mixed solution. The manufacturing method of the heat shield component further includes the coating step of applying the mixed solution to the substrate so as to obtain the coated product. The manufacturing method of the heat shield component further includes the heating step of heating the coated product to form the base body including the ceramic from the ceramic precursor, and leading the heat-expandable microspheres to foam so as to form the ceramic porous layer in which the pores are included in the base body. The manufacturing method of the heat shield component sets the porosity of the ceramic porous layer to 40% to 70%.

According to the present embodiment, the mixed solution including the sol and the heat-expandable microspheres is applied to the substrate and then heated. This step can form the ceramic porous layer at a lower temperature than a case of thermal spraying. The manufacturing method thus can provide the ceramic porous layer while preventing great deformation of the substrate when the substrate includes a material easy to soften, for example.

The manufacturing method according to the present embodiment capable of forming the ceramic porous layer at a relatively low temperature as described above, does not need to use particular equipment such as thermal spraying. The manufacturing method thus can form the ceramic porous layer on the substrate at relatively low costs.

The manufacturing method of the heat shield component according to the present embodiment can provide the heat shield component having high heat-insulating properties as described above. The heat shield component when used in an internal combustion engine, for example, can avoid releasing heat in a combustion chamber, so as to improve the thermal efficiency in the internal combustion engine.

EXAMPLES

Hereinafter, the present embodiment is described in more detail below with reference to Examples and Comparative Examples, but is not intended to be limited to the following examples.

Example 1

First, a substrate made of aluminum and having a thickness of 9.5 mm was impregnated in hot water at 100° C. for 10 minutes to be cleaned so as to improve adhesion. A density $\rho_1$ of the substrate was 2700 kg/m$^3$, a thermal conductivity $\lambda_1$ of the substrate was 236 W/(m·K), and a specific heat capacity $C_{1P}$ was 910 J/(kg·K).

Subsequently, a zirconium alkoxide as a material of a base body was dissolved in an organic solvent, and heat-expandable microspheres as particles were added thereto so as to prepare a mixed solution. This mixed solution includes 70% by mass of the material of the base body and 30% by mass of the particles. The mixed solution was then applied to the substrate cleaned as described above by a spin coater such that a thickness of a ceramic porous layer resulted in 62.8 μm after the organic solvent was volatilized.

The heat-expandable microspheres were used having an average particle diameter including an outer shell which was 15 μm and filled with hydrocarbon, the outer shell being formed of thermoplastic resin with a thickness of 3 μm or greater.

The coated product obtained was heated and dried at 40° C. for 20 minutes, and further heated at 110° C. for 140 minutes to cause the heat-expandable microspheres to foam. The coated product was further heated at 250° C. for 150 minutes to volatilize the organic solvent, and then cooled in air. A heat shield component was thus obtained in which a ceramic porous layer was formed on the substrate.

Example 2

The mixed solution was applied to the substrate such that the thickness of the ceramic porous layer after the volatilization of the organic solvent resulted in 98.1 μm. A heat shield component of this example was obtained in the same manner as Example 1 except for the above step.

Example 3

A metal alkoxide which was a precursor of aluminum nitride was used as a material of the base body, instead of the zirconium alkoxide. The mixed solution was prepared so as to include 85% by mass of the material of the base body and 15% by mass of the particles. The mixed solution was applied to the substrate such that the thickness of the ceramic porous layer after the volatilization of the organic solvent resulted in 80.4 μm. A heat shield component of this example was obtained in the same manner as Example 1 except for the above steps.

Example 4

The mixed solution was applied to the substrate such that the thickness of the ceramic porous layer after the volatilization of the organic solvent resulted in 103.0 μm. A stacked body including the substrate and the ceramic porous layer was prepared in the same manner as Example 1 except for the above step.

Subsequently, a solution of polysilazane was applied to the surface of the ceramic porous layer of the stacked body and was then cured to form a cover layer including silica with a thickness of 0.5 μm, so as to obtain a heat shield component of this example.

Example 5

A metal alkoxide which was a precursor of aluminum nitride was used as a material of the base body, instead of the zirconium alkoxide. The mixed solution was prepared so as to include 85% by mass of the material of the base body and 15% by mass of the particles. The mixed solution was applied to the substrate such that the thickness of the ceramic porous layer after the volatilization of the organic solvent resulted in 85.0 μm. A stacked body including the substrate and the ceramic porous layer was prepared in the same manner as Example 1 except for the above steps.

Subsequently, a solution of polysilazane was applied to the surface of the ceramic porous layer of the stacked body and was then cured to form a cover layer including silica with a thickness of 0.5 μm, so as to obtain a heat shield component of this example.

Comparative Example 1

The aluminum substrate without the ceramic porous layer stacked thereon was used.

Comparative Example 2

The surface of the substrate was anodized so as to form an anodized aluminum layer with a thickness of 70.0 μm, instead of the ceramic porous layer. A stacked body including the substrate and the anodized aluminum layer was prepared in the same manner as Example 1 except for the above step.

Subsequently, a solution of polysilazane was applied to the surface of the anodized aluminum layer of the stacked body and was then cured to form a cover layer including silica with a thickness of 0.5 μm, so as to obtain a heat shield component of this example.

Comparative Example 3

Partially-stabilized zirconia particles ($ZrO_2$-$8Y_2O_3$, volume mean diameter: 50 μm to 60 μm) were thermal-sprayed to the surface of the substrate so as to form a zirconia thermal-sprayed layer with a thickness of 500.0 μm, instead of the ceramic porous layer. A heat shield component of this example was obtained in the same manner as Example 1 except for the above step. Any particles such as heat-expandable microspheres are not added to the porous layer.

Comparative Example 4

A heat shield component of this example was obtained in the same manner as Comparative Example 3, except that the thickness of the zirconia thermal-sprayed layer was 100.0 μm. Any particles such as heat-expandable microspheres are not added to the porous layer.

Comparative Example 5

A metal alkoxide which was a precursor of aluminum nitride was used as a material of the base body, instead of the zirconium alkoxide. The mixed solution was applied to the substrate such that the thickness of the ceramic porous layer after the volatilization of the organic solvent resulted in 100.0 μm. A heat shield component of this example was obtained in the same manner as Example 1 except for the above steps. Any particles such as heat-expandable microspheres are not added to the porous layer.

Comparative Example 6

The mixed solution was prepared so as to include 85% by mass of the material of the base body and 15% by mass of the particles. The mixed solution was applied to the substrate such that the thickness of the ceramic porous layer after the volatilization of the organic solvent resulted in 36.4 μm. A heat shield component of this example was obtained in the same manner as Example 1 except for the above steps.

Comparative Example 7

The mixed solution was prepared so as to include 85% by mass of the material of the base body and 15% by mass of the particles. The mixed solution was applied to the substrate such that the thickness of the ceramic porous layer after the volatilization of the organic solvent resulted in 184.7 µm. A heat shield component of this example was obtained in the same manner as Example 1 except for the above steps.

Comparative Example 8

Hollow silica beads were used instead of the heat-expandable microspheres. The mixed solution was prepared so as to include 80% by mass of the material of the base body and 20% by mass of the particles. The mixed solution was applied to the substrate such that the thickness of the ceramic porous layer after the volatilization of the organic solvent resulted in 313.0 µm. A heat shield component of this example was obtained in the same manner as Example 1 except for the above steps.

Comparative Example 9

A metal alkoxide which was a precursor of aluminum nitride was used as a material of the base body, instead of the zirconium alkoxide. Hollow silica beads were used instead of the heat-expandable microspheres. The mixed solution was prepared so as to include 80% by mass of the material of the base body and 20% by mass of the particles. The mixed solution was applied to the substrate such that the thickness of the ceramic porous layer after the volatilization of the organic solvent resulted in 47.0 µm. A heat shield component of this example was obtained in the same manner as Example 1 except for the above steps.

[Evaluation]

The heat shield components obtained in Examples and Comparative Examples were evaluated as follows. Table 1 lists the evaluation results.

The thermal conductivity of the material of the base body was measured by a laser flash method according to JIS R1611:2010 (Measurement methods of thermal diffusivity, specific heat capacity, and thermal conductivity for fine ceramics by flash method).

<Porosity p>

The porosity p (%) of the porous layer was calculated such that a micrograph of the heat shield component in cross section imaged by a scanning electron microscope (SEM) was analyzed. In particular, first, the cross section of the porous layer was imaged with the SEM. Subsequently, the scanning electron micrograph was converted into a grayscale image with a compact multi-purpose image analyzer LUZEX (registered trademark) AP (available from NIRECO CORPORATION). Using a binary image in which a threshold was designated between pores and other parts, a percentage of the areas of the pores with respect to the total area of the porous layer was calculated as a porosity.

<Thermal Conductivity $\lambda_1$ of Substrate>

The thermal conductivity $\lambda_1$ (W/(m·K)) of the substrate was calculated according to the formula $\lambda_1 = \rho_1 C_{1P} \alpha_1$, where $\rho_1$ is the density (kg/m³) of the substrate, $C_{1P}$ is the specific heat capacity (J/(kg·K)) of the substrate, and $\alpha_1$ is the thermal diffusivity (m²/s) of the substrate. The methods of measuring the density $\rho_1$ of the substrate, the specific heat capacity $C_{1P}$ of the substrate, and the thermal diffusivity $\alpha_1$ of the substrate are as follows:

<Density $\rho_1$ of Substrate>

The substrate was cut into a disk with a diameter of 10 mm and a thickness of 1 mm, and the weight of the disk was measured at a room temperature (20° C.) in air, so as to measure the density $\rho_1$ (kg/m³) of the substrate.

<Specific Heat Capacity $C_{1P}$ of Substrate>

The substrate was cut into a disk with a diameter of 10 mm and a thickness of 1 mm, so as to measure the specific heat capacity $C_{1P}$ (J/(kg·K)) by a laser flash method at a room temperature (20° C.) in air. The specific heat capacity of the substrate was measured with a thermal constant measuring apparatus (TC-7000, available from ULVAC-RIKO, Inc.).

<Thermal Diffusivity $\alpha_1$ of Substrate>

The substrate was cut into a disk with a diameter of 10 mm and a thickness of 1 mm, so as to measure the thermal diffusivity $\alpha_1$ (m²/s) by a laser flash method at a room temperature (20° C.) in air. The thermal diffusivity $\alpha_1$ of the substrate was measured with a thermal constant measuring apparatus (TC-7000, available from ULVAC-RIKO, Inc.).

<Thermal Diffusivity $\alpha_2$ of Porous Layer>

A thermal diffusivity $\alpha_2$ of the porous layer was measured as follows: First, the surface on the substrate side of the heat shield component obtained in each of Examples and Comparative Examples was ground into a thickness of 1 mm to prepare a two-layer stacked plate. The stacked plate was cut into a disk with a diameter of 10 mm to be used as a test piece, so as to calculate an areal heat diffusion time A of the stacked plate according to a standard temperature-time curve by a laser flash method at a room temperature (20° C.) in air. A thermal constant measuring apparatus (TC-7000, available from ULVAC-RIKO, Inc.) was used for the laser flash method. The areal heat diffusion time A can be given by the following mathematical formula (1):

[Math. 1]

$$A = \frac{\tau_1 d_1 \rho_1 C_{1P} + 3\tau_1 d_2 \rho_2 C_{2P} + 3\tau_2 d_1 \rho_1 C_{1P} + \tau_2 d_2 \rho_2 C_{2P}}{6 d_1 \rho_1 C_{1P} + 6 d_2 \rho_2 C_{2P}} \quad (1)$$

The above mathematical formula (1) leads to the following mathematical formula (2) when $X_1 = d_1 \rho_1 C_{1P}$, and $X_2 = d_2 \rho_2 C_{2P}$, where $d_1$ is the thickness (m) of the substrate, $\rho_1$ is the density (kg/m³) of the substrate, $C_{1P}$ is the specific heat capacity (J/(kg·K)) of the substrate, $d_2$ is the thickness (m) of the porous layer, $\rho_2$ is the density (kg/m³) of the porous layer, and $C_{2P}$ is the specific heat capacity (J/(kg·K)) of the porous layer. The methods of measuring the density $\rho_1$ of the substrate and the specific heat capacity $C_{1P}$ of the substrate are the same as described above. The method of measuring the density $\rho_2$ of the porous layer and the specific heat capacity $C_{2P}$ of the porous layer are described below.

[Math. 2]

$$A = \frac{\tau_1}{6} \frac{X_1 + 3X_2}{X_1 + X_2} + \frac{\tau_2}{6} \frac{3X_1 + X_2}{X_1 + X_2} \quad (2)$$

The above mathematical formula (2) can lead to the following mathematical formula (3), so as to calculate the heat diffusion time $\tau_2$ of the porous layer.

[Math. 3]

$$\frac{\tau_2}{6} = \frac{X_1 + X_2}{3X_1 + X_2} A - \frac{X_1 + 3X_2}{3X_1 + X_2} \frac{\tau_1}{6} \quad (3)$$

The heat diffusion time $\tau_2$ of the porous layer calculated according to the mathematical formula (3) is substituted in the following mathematical formula (4), so as to calculate the thermal diffusivity $\alpha_2$ of the porous layer.

[Math. 4]

$$\alpha_2 = \frac{d_2^2}{\tau_2} \quad (4)$$

<Density $\rho_2$ of Porous Layer>

The density $\rho_2$ (kg/m³) of the porous layer was measured as follows: First, the porous layer with a thickness of about 1 mm was formed on the substrate to obtain the stacked body. The stacked body was then cut into a test piece of 13 mm×5 mm to measure its weight, so as to calculate the density of the stacked body. The density of the substrate obtained as described above was subtracted from the density of the stacked body, so as to calculate the density of the porous layer. The thickness of the porous layer was calculated by subtracting the thickness of the substrate from the thickness of the stacked body. The thicknesses of the stacked body and the substrate were measured with a scanning electron microscope (SEM). The measurement with the SEM uses an average value of thicknesses measured at five points at high magnification and three points at low magnification.

<Specific Heat Capacity $C_{2P}$ of Porous Layer>

The specific heat capacity $C_{2P}$ (J/(kg·K)) of the porous layer was measured as follows: First, a sheet of Teflon (registered trademark) tape was attached to the porous layer side of the heat shield component obtained in each example, and was then impregnated with hydrochloric acid so as to completely dissolve the substrate. The rest of the porous layer was impregnated with acetone to remove the Teflon (registered trademark) tape from the porous layer, so as to obtain a sample of the porous layer in a powder state. Subsequently, 12 mg of the sample was measured by differential scanning calorimetry (DSC) so as to measure the specific heat capacity of the porous layer. The measurement by the DSC was performed under the conditions of an argon gas atmosphere and a measurement temperature of 20° C. The specific heat capacity was measured by the DSC with a differential scanning calorimeter (DSC-7, available from PerkinElmer, Inc.).

<Thermal Conductivity $\lambda_2$ of Porous Layer>

A thermal conductivity $\lambda_2$ (W/(m·K)) of the porous layer was calculated according to the formula $\lambda_2 = \rho_2 C_{2P} \alpha_2$, where $\rho_2$ is the density of the porous layer, $C_{2P}$ is the specific heat capacity of the porous layer, and $\alpha_2$ is the thermal diffusivity of the porous layer. The methods of measuring the density $\rho_2$ of the porous layer, the specific heat capacity $C_{2P}$ of the porous layer, and the thermal diffusivity $\alpha_2$ of the porous layer are as described above.

<Volumetric Specific Heat $C_{2\nu}$ of Porous Layer>

A volumetric specific heat $C_{2\nu}$ (J/(m³·K)) of the porous layer was calculated according to the formula $C_{2\nu} = C_{2P}\rho_2$, where $C_{2P}$ is the specific heat capacity (J/(kg·K)) of the porous layer, and $\rho_2$ is the density (kg/m³) of the porous layer. The methods of measuring the specific heat capacity $C_{2P}$ of the porous layer and the density $\rho_2$ of the porous layer are as described above.

<Cooling Response Test>

Figure 5:
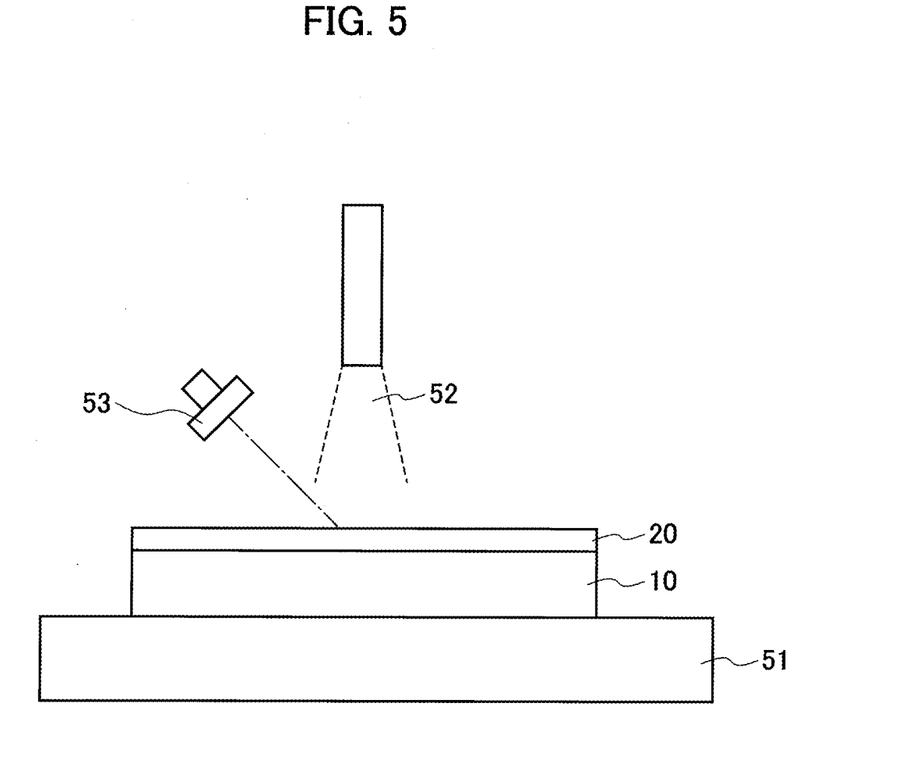
FIG. 5 is a schematic view showing a measurement method for a cooling response test.

As shown in FIG. 5, the heat shield component of each example was cut into a test piece with a size of 50 mm in length, 50 mm in width, and 9.5 mm in thickness, and the test piece on the substrate 10 side was put on a heater 51. The test piece on the substrate 10 side was heated by the heater 51 to increase the temperature on the surface of the porous layer 20 to 250° C., and a blow of air 52 at 20° C. was then applied at a flow rate of 0.002 m³/sec to the surface of the porous layer 20 so as to measure the temperature on the surface of the porous layer 20. The temperature on the surface of the porous layer 20 was measured with a temperature distribution image acquired by an infrared camera 53. Table 1 also lists the results indicating a decrease in temperature on the surface of the porous layer 20 measured ten seconds after the blow of air 52 was applied. While FIG. 5 illustrates the case of Example 1 in which the ceramic porous layer 20 is the uppermost layer, the cooling response test can be performed on the coat layer 30, instead of the ceramic porous layer 20, when the coat layer 30 is the uppermost layer.

TABLE 1

| | | Base body | | Particles | | | | Porous layer | | | | | |
|---|---|---|---|---|---|---|---|---|---|---|---|---|---|
| | Substrate Material | Material | Thermal conductivity (W/(m·K)) | Material | Content (mass %) | Thickness (μm) | Porosity ρ (%) | Thermal conductivity $\lambda_2$ (W/(m·K)) | Density $\rho_2$ (kg/m³) | Specific heat capacity $C_{P2}$ (J/(kg·K)) | Volumetric specific heat $C_{2\nu}$ (kJ/m³·K) | Cover layer material | Cooling response test (° C.) |
| Example 1 | Al | ZrO₂ | 2.0 | Heat-expandable microspheres | 30 | 62.8 | 49.2 | 0.12 | 840 | 1000 | 840 | — | 20.5 |
| Example 2 | Al | ZrO₂ | 2.0 | Heat-expandable microspheres | 30 | 98.1 | 57 | 0.18 | 960 | 1000 | 960 | — | 19.5 |
| Example 3 | Al | AlN | 4.4 | Heat-expandable microspheres | 15 | 80.4 | 64.5 | 0.12 | 1100 | 740 | 810 | — | 25.9 |

TABLE 1-continued

| | | Porous layer | | | | | | | | | | |
|---|---|---|---|---|---|---|---|---|---|---|---|---|
| | | Base body | | Particles | | | | | | Specific heat capacity | Volumetric specific heat | | Cooling |
| | Substrate Material | Material | Thermal conductivity (W/(m·K)) | Material | Content (mass %) | Thickness (μm) | Porosity ρ (%) | Thermal conductivity $\lambda_2$ (W/(m·K)) | Density $\rho_2$ (kg/m³) | $C_{P2}$ (J/(kg·K)) | $C_{2v}$ (kJ/m³·K) | Cover layer material | response test (° C.) |
| Example 4 | Al | ZrO$_2$ | 2.0 | Heat-expandable microspheres | 30 | 103.0 | 57 | 0.18 | 960 | 1000 | 960 | Silica | 24.2 |
| Example 5 | Al | AlN | 4.4 | Heat-expandable microspheres | 15 | 85.0 | 64.5 | 0.12 | 1100 | 740 | 810 | Silica | 32.1 |
| Comparative Example 1 | Al | — | — | — | — | — | — | — | — | — | — | — | 2.2 |
| Comparative Example 2 | Al | Anodized aluminum | — | — | — | 70.0 | 12.7 | 0.56 | 1000 | 1030 | 1030 | Silica | 17.7 |
| Comparative Example 3 | Al | ZrO$_2$ (thermal spray) | 2.0 | — | — | 500.0 | 10 | 1.36 | 5000 | 510 | 2550 | — | 2.2 |
| Comparative Example 4 | Al | ZrO$_2$ (thermal spray) | 2.0 | — | — | 100.0 | 0 | 1.0 | 5680 | 470 | 2670 | — | 5.1 |
| Comparative Example 5 | Al | AlN | 4.4 | — | — | 100.0 | 0 | 4.4 | 3260 | 710 | 2320 | — | 5.4 |
| Comparative Example 6 | Al | ZrO$_2$ | 2.0 | Heat-expandable microspheres | 15 | 36.4 | 37.3 | 0.8 | 2330 | 970 | 2260 | — | 8.6 |
| Comparative Example 7 | Al | ZrO$_2$ | 2.0 | Heat-expandable microspheres | 15 | 184.7 | 36.8 | 0.55 | 2370 | 740 | 1760 | — | 12.9 |
| Comparative Example 8 | Al | ZrO$_2$ | 2.0 | Hollow silica particles | 20 | 313.0 | 47.1 | 0.63 | 1460 | 1310 | 1910 | — | 11.5 |
| Comparative Example 9 | Al | AlN | 4.4 | Hollow silica particles | 20 | 47.0 | 40.2 | 2.58 | 2790 | 600 | 1670 | — | 14.1 |

The results of the cooling response test shown in Table 1 revealed that the heat shield components in Examples 1 to 5 achieved 19.5° C. or higher indicating high heat-insulating properties, while the heat shield components in Comparative Examples 1 to 9 resulted in 17.7° C. or lower. The reason for such high heat-insulating properties achieved in the respective Examples is presumed to be that the pores covered with the thermoplastic rein on the inner walls are provided in the base body when the heat-expandable microspheres are added to form the ceramic porous layer.

In contrast, Comparative Examples 1 to 5 could not achieve preferred heat-insulating properties, since the ceramic porous layer including particles such as heat-expandable microspheres sufficient to block heat was not formed on the substrate.

In addition, the case, such as Comparative Examples 6 and 7, in which the ceramic porous layer includes the heat-expandable microspheres but has a porosity not sufficient to block heat, could not achieve preferred heat-insulating properties.

Further, the case, such as Comparative Examples 8 and 9, in which the ceramic porous layer has a porosity in a predetermined range but includes the hollow silica particles, instead of the heat-expandable microspheres, could not achieve preferred heat-insulating properties. The reason that the heat shield components of Comparative Examples 8 and 9 could not achieve preferred heat-insulating properties can be presumed to be that the pores in the ceramic porous layer are covered on the inner walls with silica having higher thermal conductivity than the thermoplastic resin.

While the present invention has been described above by reference to the examples, it should be understood that the present invention is not intended to be limited to the above descriptions, and various alternatives and modifications will be apparent to those skilled in the art.

The heat shield component according to the present invention includes the substrate, and the ceramic porous layer arranged on the substrate, the ceramic porous layer including the base body including ceramic, and the pores included in the base body. The inner walls of the pores are covered with the thermoplastic resin, and the porosity of the ceramic porous layer is in the range of 40% to 70%. The present invention can provide the heat shield component having high heat-insulating properties.

REFERENCE SIGNS LIST

10 SUBSTRATE
20 CERAMIC POROUS LAYER
21 BASE BODY
26 PORE
27 HOLLOW PORTION
28 THERMOPLASTIC RESIN LAYER
100 HEAT SHIELD COMPONENT

What is claimed is:
1. A manufacturing method of a heat shield component, the manufacturing method comprising:
a mixing step of mixing sol including a ceramic precursor with heat-expandable microspheres having an outer shell formed of thermoplastic resin and encapsulating a foaming agent so as to obtain a mixed solution;

a coating step of applying the mixed solution to a substrate to obtain a coated product; and a heating step of heating the coated product to form a base body including a ceramic from the ceramic precursor, and leading the heat-expandable microspheres to foam so as to form a ceramic porous layer including closed pores in the base body, the ceramic porous layer having a porosity in a range of 40% to 70%.

2. The manufacturing method of a heat shield component according to claim 1, wherein a temperature for heating the coated product is 280° C. or lower.

3. The manufacturing method of a heat shield component according to claim 1, wherein the heat-expandable microspheres are formed of a single layer of the outer shell.

4. The manufacturing method of a heat shield component according to claim 1, wherein the ceramic precursor includes zirconium.

5. The manufacturing method of a heat shield component according to claim 1, wherein the ceramic precursor includes aluminum.

6. The manufacturing method of a heat shield component according to claim 1, wherein the foaming agent includes at least one selected from a group consisting of hydrocarbon, chlorofluorocarbon, and tetraalkylsilane.

7. The manufacturing method of a heat shield component according to claim 1, wherein a film thickness of the outer shell of the heat-expandable microspheres before foaming is in a range of 0.1 μm to 20 μm.

8. The manufacturing method of a heat shield component according to claim 1, wherein an average particle diameter of the heat-expandable microspheres before foaming is in a range of 1 μm to 50 μm.

9. The manufacturing method of a heat shield component according to claim 1, wherein a content of the heat-expandable microspheres is in a range of 10% to 30% by mass with respect to 100% by mass of a total amount of the sol and the heat-expandable microspheres excluding an organic solvent.

* * * * *